Figure 1:
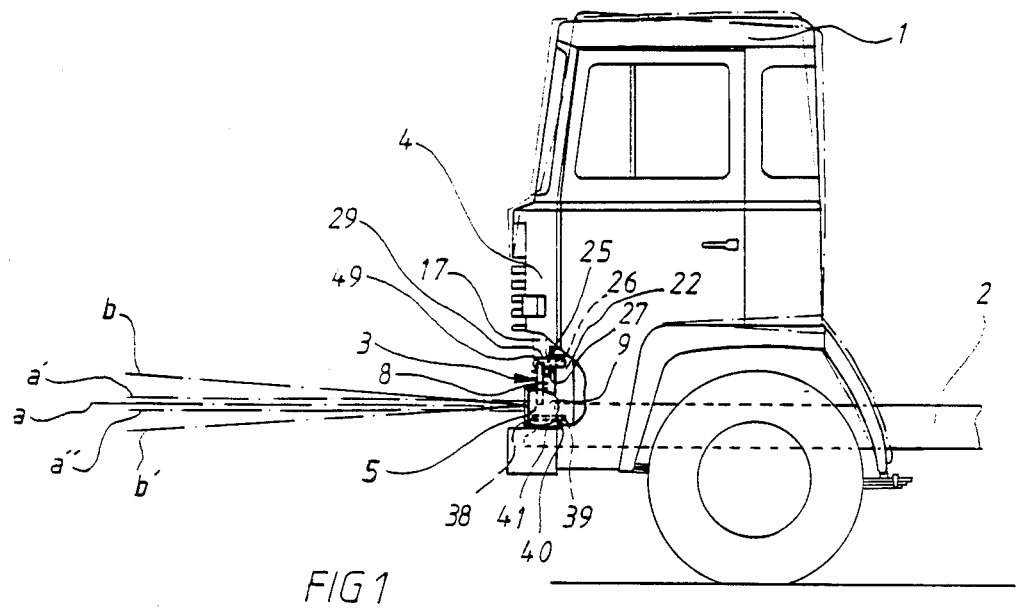

United States Patent [19]
Johansson

[11] Patent Number: 4,887,191
[45] Date of Patent: Dec. 12, 1989

[54] ARRANGEMENT FOR THE SUSPENSION OF A LIGHTING UNIT ON VEHICLES

[75] Inventor: Rolf Johansson, Trosa, Sweden

[73] Assignee: Saab-Scania Aktiebolag, Sweden

[21] Appl. No.: 259,268

[22] PCT Filed: Jan. 15, 1988

[86] PCT No.: PCT/SE88/00005
§ 371 Date: Oct. 7, 1988
§ 102(e) Date: Oct. 7, 1988

[87] PCT Pub. No.: WO88/06109
PCT Pub. Date: Aug. 25, 1988

[30] Foreign Application Priority Data
Feb. 10, 1987 [SE] Sweden ............................. 8700497.4

[51] Int. Cl.[4] .......................... B60Q 1/00; F21V 15/04
[52] U.S. Cl. ...................................... 362/61; 362/369; 362/390; 180/89.19
[58] Field of Search ............... 180/89.19; 362/61, 369, 362/370, 390, 288

[56] References Cited
U.S. PATENT DOCUMENTS

| | | | |
|---|---|---|---|
| 407,409 | 7/1889 | Lucas | 362/369 X |
| 443,207 | 12/1890 | Hering | 362/369 X |
| 1,502,866 | 7/1924 | Moore | 362/369 X |
| 2,494,652 | 1/1950 | Gangert | 362/369 X |
| 4,194,236 | 3/1980 | Pettersson et al. | 362/66 |
| 4,737,891 | 4/1988 | Burton | 362/269 X |

Primary Examiner—Ira S. Lazarus
Assistant Examiner—Peggy A. Neils
Attorney, Agent, or Firm—Ostrolenk, Faber, Gerb & Soffen

[57] ABSTRACT

The invention relates to an arrangement for the suspension of a headlamp (5) on the front (4) of a driver's cab (1) which is spring-mounted on a chassis frame (2). The object of the invention is to prevent relative movements between the driver's cab (1) and the chassis frame (2) from affecting the alignment of the optic axis of the headlamp (5). The invention is essentially characterized in that each headlamp (5) is pivotably connected to an upper and lower connecting arm respectively (29, 40), which connecting arms are pivotably connected to the chassis frame (2), and in that one connecting arm (29) is also pivotably connected to the driver's cab (1).

14 Claims, 2 Drawing Sheets

ARRANGEMENT FOR THE SUSPENSION OF A LIGHTING UNIT ON VEHICLES

The present invention relates to an arrangement for the suspension of a front lighting unit on a vehicle having a vehicle chassis frame and a bodywork element, for example a vehicle cab, suspended on the vehicle chassis frame, in which connection at least one spring device is arranged between the vehicle chassis frame and the bodywork element.

It is known to rigidly install headlamps on the front of a driver's cab, for example on trucks. A headlamp arranged in this way follows the movements of the driver's cab relative to the chassis frame, which causes variations in the lighted on the roadway and a risk of dazzling oncoming traffic. The disadvantages are particularly marked when, for reasons of comfort, the driver's cab is spring-mounted on the chassis frame. This in fact gives rise to not inconsiderable relative movements between the driver's cab and the chassis frame when travelling over uneven ground and on braking or acceleration of the vehicle.

In order to prevent the said relative movements between the driver's cab and the chassis frame from affecting the alignment of the optic axis of the headlamp, it is known to assemble the headlamps in a front bumper connected rigidly to the chassis frame. This certainly prevents the undesirable transfer of movement to the headlamps, but the necessary lowering of the positioning of the headlamp from a position on the front of the driver's cab to a position in the bumper results in a reduction of the distance which the headlamps can illuminate and moreover increases the risk of damage and/or fouling of the headlamps.

Swedish Patent 407,544 discloses a headlamp positioning in which the optic axis of a headlamp is maintained essentially unchanged on a driver's cab which is arranged rigidly relative to the chassis frame at its front part, but is spring-mounted relative to the frame at its rear part. However, the headlamp positioning disclosed in the patent does not solve the abovementioned problem in a so-called fully sprung driver's cab.

The object of the present invention is to eliminate the abovementioned disadvantages. For this purpose, the invention is characterized in that the lighting unit is pivotably connected, via at least one upper and one lower bearing, to an upper and lower connecting arm respectively, which connecting arms are pivotably connected to the chassis frame and are arranged essentially parallel in a longitudinally extending, vertical plane relative to the vehicle, and in that the lighting unit is pivotably connected to the bodywork element, by which means, during the spring movements of the bodywork element relative to the chassis frame, the optic axis of the lighting unit executes a parallel movement in the said vertical plane.

In the arrangement according to the invention, the lighting units follow the suspension travel of the cab without the optic lighting angle of the headlamps being changed in relation to the chassis frame. In the arrangement according to the invention, the alignment of the optic axis of the headlamps is essentially only affected by the movements of the chassis frame relative to the roadway. These movements are considerably less than the movements of a driver's cab suspended on the chassis frame.

The arrangement according to the invention also makes it possible for the lighting units to be positioned at a suitable height on the driver's cab, so that lighting advantages can be achieved without the ability of the driver's cab to move relative to the chassis frame having to be restricted.

Another advantage is that the arrangement according to the invention makes it possible for gaps between respective lighting units and surrounding bodywork panels to be made small, since the lighting units follow the suspension travel of the cab. This facilitates maintenance and cleaning of the vehicle and permits a more aesthetic design of the vehicle front.

Figure 2:
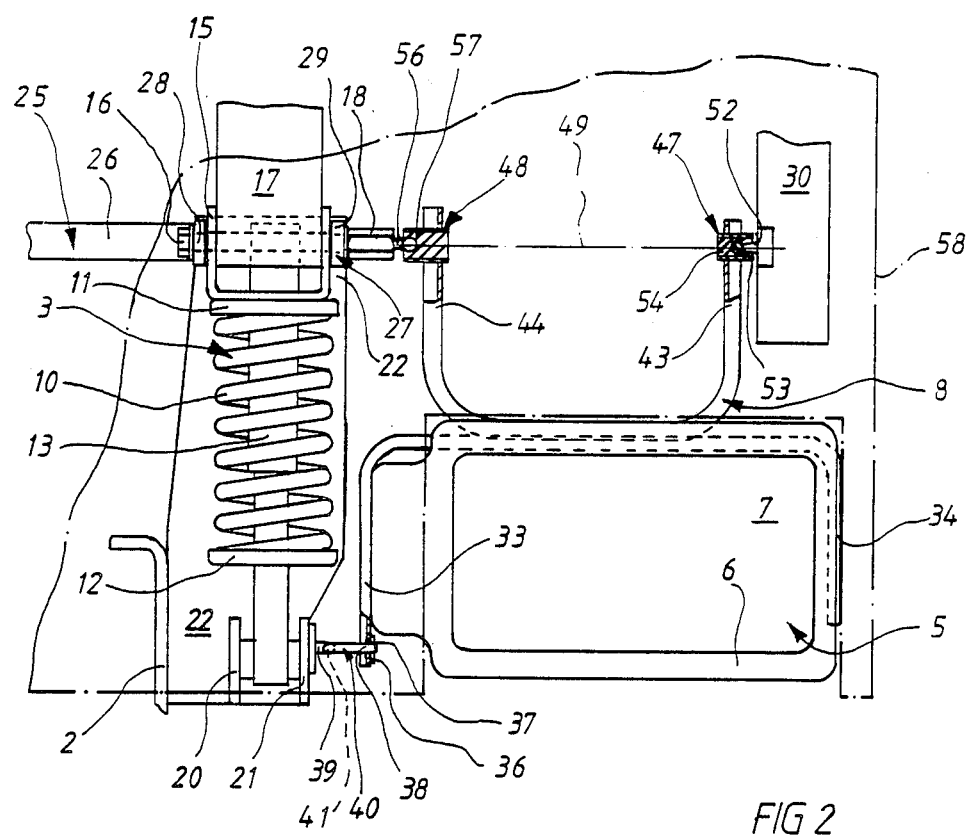
Figure 3:
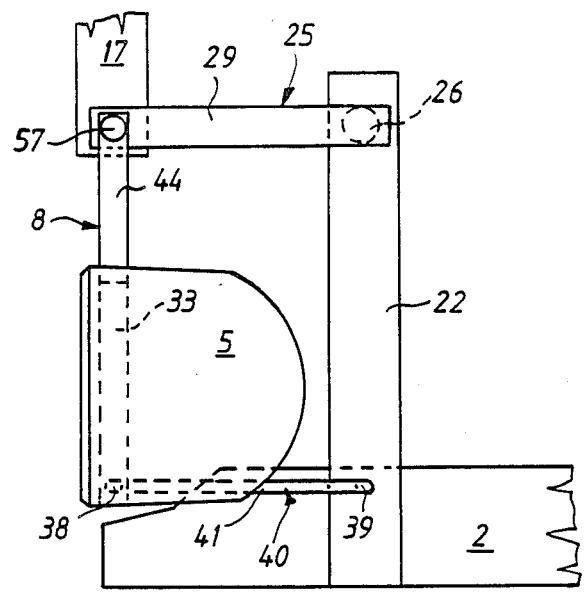
Figure 4:
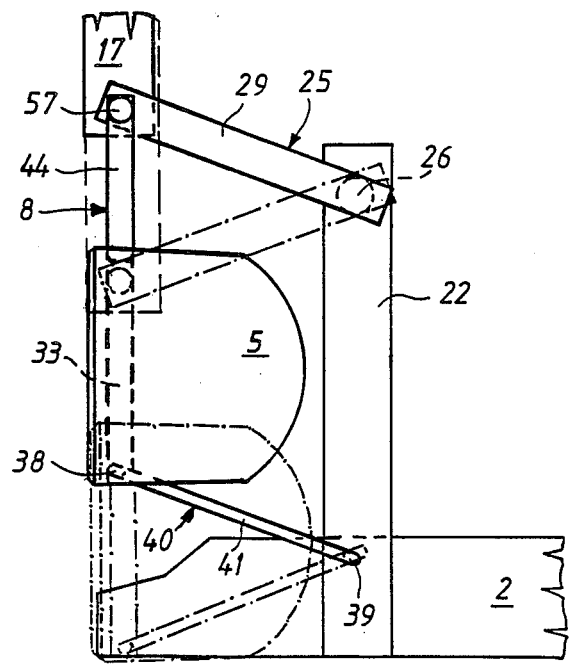

Other features characterizing the invention emerge from the following patent claims and from the description given below of an embodiment illustrating the invention. In the description, reference is made to the attached figures in which FIG. 1 shows a side view of a truck cab provided with an arrangement according to the invention for suspension of a lighting unit, FIG. 2 shows a front view of the arrangement, FIG. 3 shows a simplified side view of the arrangement in FIG. 1, and FIG. 4 shows a simplified side view of the arrangement in FIG. 1 with the cab in its upper respective lower position.

On the truck shown in FIG. 1 there is arranged a driver's cab 1 which is spring-mounted on a chassis frame 2. When the truck is travelling over uneven ground, vibrations of the driver's cab 1 may occur. These vibrations, which are shown by the chain dotted cab outlines, are limited by the spring properties of a front and rear spring suspension of the cab. Only the front cab suspension is shown in the figures.

The front cab suspension is described in detail below. For the rear cab suspension, a previously known spring suspension of the cab is used which does not constitute part of the present invention and is therefore delimited from detailed description.

On the front 4 of the driver's cab 1 there are arranged two lighting units which are designed as headlamps 5. Only the one headlamp 5 is shown in the figures. Each headlamp 5 is arranged in a suspension device 8 according to the invention. When the driver's cab 1 vibrates, the optic axis a of the headlamp 5 moves while remaining in parallel between two end positions a' and a'' which are shown by chain dotted lines in FIG. 1. The distance, which the optic axis a is moved thus depends on the already mentioned spring properties of the cab suspension.

In order to demonstrate the advantages which are achieved with the arrangement 8 according to the invention, FIG. 1 also shows the end angle positions b and b' between which the optic axis a oscillates in a truck with conventional suspension of the headlamps 5 on the vehicle front 4.

Close to its front edge, the driver's cab 1 is spring-mounted with two spring devices 3, of which only one is shown in the figures. Each spring device 3 is made up of a spring leg. The spring leg essentially consists of a compression spring 10 of helical design which, via an upper and a lower spring seat 11 and 12 respectively, interacts with a shock absorber 13. The top side of the upper spring seat 11 is attached to a U-shaped stirrup 15. The stirrup 15 is pivotably mounted, via a bolt 16, in a brace 17 which is incorporated in the framework of the cab 1.

The axial position of the bolt 16 is fixed by a nut 18 which also constitutes an attachment point for a ball socket 56 described below. The lower part of the spring leg is pivotably mounted between two plates 20 and 21 extending in the longitudinal direction of the truck, which plates are securely arranged on an attachment 22 fixed to the frame.

The spring leg interacts with a stabilizer 25 which essentially consists of a torsion rod 26 at the ends of which two legs 28, 29 are arranged fixedly in terms of rotation. The two legs 28, 29 extend in the longitudinal direction, that is in the direction of travel of the truck.

The stabilizer 25 is arranged transversely on the truck in order to damp, in a known manner, the various spring movements of the spring legs. Each leg 28, 29 thus constitutes a connecting arm whose one end is pivotably mounted around the bolt 16 on the respective brace 17 while its other end, i.e. the torsion rod 26, is pivotably mounted in the attachment 22 which is fixed to the frame and extends behind the bolt 16.

Between the brace 17 and a corner column 30, which is also incorporated in the framework of the driver's cab 1, a headlamp 5 is pivotably arranged. The headlamp 5 comprises a support frame 6 which holds a headlamp lens 7, a reflector (not shown) and a protective casing 9 covering the reflector. The support frame 6 is arranged essentially vertically and comprises a number of screws (not shown) for regulating the beam of the headlamp 5 both vertically and laterally.

The headlamp 5 is securely arranged, for example by screw connection, between two legs 33 and 34 respectively directed downwards in an H-shaped suspension device 8. The leg 33 facing towards the brace 17 has a hole 36 made in its lower edge, in which hole a bushing 37 is arranged to accommodate one end 38 of a connecting arm 40. The end 38 of the connecting arm 40 is thus rotatably mounted about a transverse horizontal axis line through the bushing 37 and fixed axially with circlips or the like (not shown). The other end 39 of the conecting arm 40 is similarly rotatably mounted about a transverse horizontal axis line through a bushing (not shown) in the lower part of the attachment 22 fixed to the frame. Between its end 38, 39 the connecting arm 40 has an intermediate part 41 which, in a vertical plane, is parallel to the two legs 28, 29 of the stabilizer 35 (see FIG. 1). The ends 38, 39 of the connecting arms are thus arranged at an angle relative to the intermediate part 41.

FIG. 3 shows a headlamp 5 and its connecting arms 29, 40 with the cab 1 in its normal position while the headlamp 5 and its connecting arms 29, 40 in FIG. 4 are shown with continuous lines in an upper position and with chain dotted lines in a lower position.

The upwardly directed legs 43 and 44 of the H-shaped suspension device 8 are rotatably mounted, via two ball joints 47 and 48 respectively, about a transverse horizontal axis line 49 whose extension is essentially parallel to and in front of the extension of the torsion rod 26 of the transverse stabilizer 25. The one ball joint 47 comprises a pin 52 whose one end is attached to the corner column 30 and whose other end is designed with a ball socket 53. The ball socket 53 interacts with a ball race 54 which is attached to the leg 43 to form the ball joint 47. The other ball joint 48 is made up of a ball socket 56 fixed in the nut 18 and a ball race 57 which interacts therewith and is fixedly connected to the leg 44.

In the arrangement according to the invention the horizontal distance in the longitudinal direction between the bearing 48 in the headlamp suspension 8 and the bearing of the tension rod 26 in the attachment 22 fixed to the frame is the same or essentially the same size as the horizontal distance in the longitudinal direction between the bearing of the lower connecting arm 40 in the headlamp suspension 8 and its bearing in the attachment 22 fixed to the frame. Moreover, the intermediate part 41 of the lower connecting arm 40 and the legs 28, 29 are, in a vertical plane, essentially horizontal and parallel to the chassis frame 2 when the vehicle cab 1 does not receive any vibrations from the chassis frame 2.

The figures show the suspension of a headlamp. It is possible to couple to this, for example, an indicator light in order to form an integrated lighting unit which is suspended in a suspension device according to the invention.

The chain dotted lines 58, which partially surround the headlamp in FIG. 2, represents outer cover plates of the driver's cab.

The described arrangement according to the invention has the following function. During travel, the driver's cab 1 vibrates relative to the chassis frame 2 as a function of unevenness of the roadway. Such vibrations result in the spring leg being subjected to longitudinal movement. Because the stabilizer 25 interacts with the spring leg, the legs 28, 29 of the stabilizer 25 executes a vibrational movement upwards or downwards as a function of the vibrations of the driver's cab 1.

Since the headlamp 5 is pivotably connected, via the suspension device 8 according to the invention, to the leg 29 and held by the ball joint 47 in the corner column 30 and the lower connecting arm 40, the headlamp 5 executes an essentially vertical movement when the driver's cab 1 vibrates.

From FIG. 4, it can be seen that the connecting arm 29 pivots at the forward end around the ball race 57 and at the rear end around a fixed pivot defined by the bar 26, and that the connecting arm 40 pivots correspondingly around its ends 38, 39.

Furthermore, the Figures show that the forward end of both the connecting arm 29 and the connecting arm 40 move up and down during spring movement of the cab relative to the chassis frame, while the rear end of the connecting arms 29, 40 stay at the same height and merely pivot relative to the attachment 22.

When the headlamp 5 moves in the vertical direction, its optic axis 9 is moved between two end positions a' and a" which are shown in FIG. 1, which results in the visibility distance for a lit headlamp 5 not being appreciably affected by the movements of the driver's cab 1, there being less risk of dazzling oncoming traffic.

In the arrangement according to the invention, the headlamps follow the spring path of the driver's cab without the optic lighting angle of the headlamps being changed in relation to the chassis frame. The alignment of the optic axis of the headlamps is essentially only affected by the movement of the chassis frame relative to the ground. These movements are considerably less than the movements of a driver's cab suspended on the chassis frame.

Because the headlamps follow the spring movement of the cab, the construction of the parts close to the headlamps on the driver's cab is facilitated. The said parts to not in fact have to be positioned and designed at such great distances from the headlamps as would otherwise be necessary for the parts to be cleared from a headlamp mounted securely relative to the chassis frame. Instead, in the arrangement according to the invention, the gaps between the headlamps and the surrounding cover panels on the driver's cab can be kept small, which facilitates the maintenance and cleaning of the vehicle and permits a more aesthetic design of the vehicle front.

The invention is not to be regarded as being restricted by the described embodiment. In the arrangement according to the invention the connecting arms can, of course, have any chosen extension between their bearing points. In the description it is stated that the upper bearing constitutes the pivotable connection to the driver's cab. However, instead of the upper bearing, it is possible to connect the lower bearing or the casing of the headlamp to the cab, without departing from the inventive concept.

What is claimed:

1. Arrangement for the suspension of a front lighting unit on a vehicle, wherein the vehicle has a chassis frame and has a body work element that is suspended on the chassis frame and is relatively movable with respect to the chassis frame, the arrangement comprising
a spring device between the chassis frame and the body work element for damping the vibration of the body work element with respect to the chassis frame;
the lighting unit including a lamp for directing light out the front of the vehicle chassis frame;
at least one upper connecting arm which is pivotably connected to the chassis frame for permitting relative movement of the upper arm with respect to the chassis frame; the upper connecting arm also being pivotably connected to the lighting unit; at least one lower connecting arm extending below the upper connecting arm also being pivotably connected to the lighting unit; at least one lower connecting arm extending below the upper connecting arm, and the lower connecting arm is also pivotably connected to the chassis frame for permitting relative movement of the lower arm with respect to the chassis frame; the lower connecting arm also being pivotably connected to the lighting unit; the upper and the lower connecting arms being essentially parallel in a longitudinal vertical plane relative to the vehicle;
the lighting unit being further pivotably connected to the body work element such that as the body work element moves with respect to the chassis frame, which movement is damped by the spring device, the lighting unit is held at an orientation such that the optical axis of the lighting unit executes a parallel movement in the vertical plane.

2. The arrangement of claim 1, wherein the body work element comprises the driver's cab of a vehicle.

3. The arrangement of claim 1, wherein the lighting unit is pivotably connected to the body work element through one of the connecting arms being pivotably connected to the body work element.

4. The arrangement of claim 3, wherein the upper connecting arm is pivotably connected to the body work unit.

5. The arrangement of claim 1, wherein the pivotable connection between the lighting unit and the body work element comprises an upper bearing between the upper connecting arm and the lighting unit and a lower bearing between the lighting unit and the lower connecting arm, the upper and lower bearings permitting relative movement of the upper and lower connecting arms respectively, with respect to the upper and lower bearings.

6. The arrangement of claim 5, wherein one of the bearings comprises a pivotable connection to the body work element.

7. The arrangement of claim 5, wherein the upper bearing comprises the pivotable connection to the body work element.

8. The arrangement of claim 7, wherein the horizontal distance in the longitudinal direction of the vehicle between the upper bearing of the upper connecting arm at the lighting unit and its pivotable connection to the chassis frame is substantially the same length as the corresponding horizontal distance between the bearing of the lower connecting arm at the lighting unit and its pivotable connection to the chassis frame.

9. The arrangement of claim 8, wherein the pivotable connection between the upper connecting arm and the chassis frame is a second upper bearing and the pivotable connection between the lower connecting arm and the chassis frame is a second lower bearing.

10. The arrangement of claim 8, wherein both the upper and the lower connecting arms are essentially horizontal in a vertical plane generally extending in the longitudinal direction of the vehicle when the body work element is in a stable, non-vibrating condition established by the spring device.

11. The arrangement of claim 1, further comprising a stabilizer of which the upper connecting arm comprises a part, and the stabilizer is connected with the spring device for damping the spring movements of the body work element relative to the chassis frame.

12. The arrangement of claim 6, wherein the spring device has a connection to the body work element and a pivotable bearing is defined on the spring device on the body work element, the upper bearing being integrated with the pivotal bearing of the spring device.

13. The arrangement of claim 1, wherein the lower connecting arm has two ends and includes a part between the two ends, the two ends of the lower connecting arm being arranged at an angle relative to the intermediate part.

14. The arrangement of claim 13, wherein the intermediate part of the lower connecting arm extends generally extending in the longitudinal direction of the vehicle.

* * * * *